United States Patent
Buslawski et al.

(10) Patent No.: US 6,898,717 B1
(45) Date of Patent: May 24, 2005

(54) NETWORK DOMAIN WITH SECURED AND UNSECURED SERVERS

(75) Inventors: John Alexander Buslawski, Austin, TX (US); David Yu Chang, Austin, TX (US); Robert H. High, Jr., Round Rock, TX (US); Derek Wan Hok Ho, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 09/620,728

(22) Filed: Jul. 20, 2000

(51) Int. Cl.⁷ .......................... H04L 9/00; G06F 15/16
(52) U.S. Cl. ...................... 713/201; 709/223
(58) Field of Search ................. 713/200, 201, 713/150, 153, 154; 709/200, 223–229, 249

(56) References Cited

U.S. PATENT DOCUMENTS

| | | | |
|---|---|---|---|
| 5,717,745 A | 2/1998 | Vijay et al. | 379/112 |
| 5,764,639 A | 6/1998 | Staples et al. | 370/401 |
| 5,790,669 A | 8/1998 | Miller et al. | 380/25 |
| 5,884,033 A | 3/1999 | Duvall et al. | 395/200.36 |
| 5,889,845 A | 3/1999 | Staples et al. | 379/211 |
| 6,182,226 B1 * | 1/2001 | Reid et al. | 713/201 |
| 6,453,419 B1 * | 9/2002 | Flint et al. | 713/201 |

OTHER PUBLICATIONS

Kuhnhauser, "A classification of interdomain actions", Oct. 1998, ACM SIGOPS Operating Systems Review, vol. 32, Issue 4, p. 47–61.*

Morrissey, "7 firewalls fit for your enterprise" Nov. 15, 1998, Network Computing, vol. 9, Issue 21, 12 pgs.*

* cited by examiner

*Primary Examiner*—Emmanuel L. Moise
*Assistant Examiner*—Christopher Revak
(74) *Attorney, Agent, or Firm*—David A. Mims, Jr.; Robert W. Wilder

(57) ABSTRACT

A method and implementing computer system are provided in which a Quality Of Protection (QOP) indication is established in a tagged component for servers in a network domain. Each server may have one QOP setting associated with the server for inbound messages and another QOP setting associated with the server for outbound messages. In an exemplary embodiment, the QOP settings are contained in a list which may be updated to include additional QOPs which the server may be equipped to support.

25 Claims, 3 Drawing Sheets

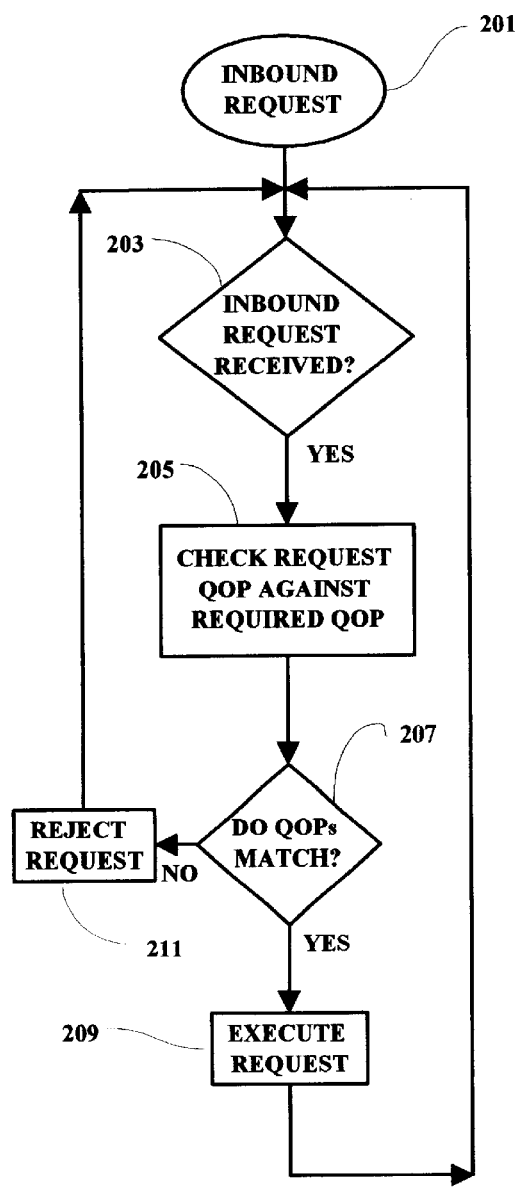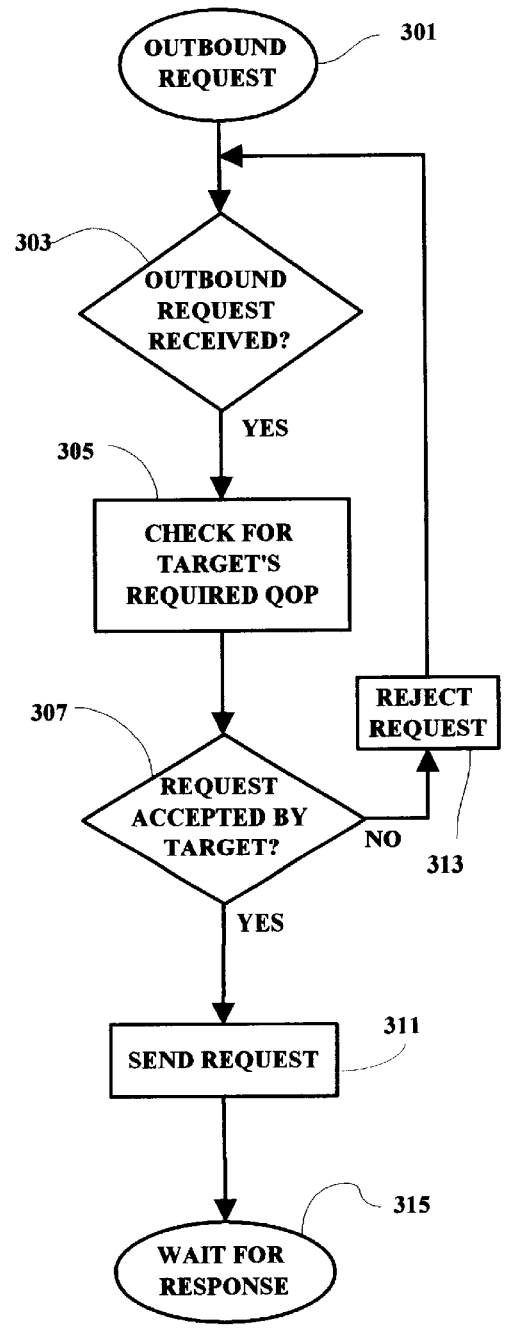
*FIG. 2*
*FIG. 3*

NETWORK DOMAIN WITH SECURED AND UNSECURED SERVERS

FIELD OF THE INVENTION

The present invention relates generally to information processing systems and more particularly to a methodology and implementation for enabling operation of secured and unsecured servers in a computer network domain.

BACKGROUND OF THE INVENTION

In networked systems, including among others, the Internet and the World Wide Web, individual users or clients are able to connect to network sites (also herein interchangeably referred to as network domains or web sites) in order to send and receive information from the network site. In one example, the user or client uses a personal computer or computer workstation to connect to a network domain or network site through an Internet service provider. However, users may also connect to a network domain using communication devices other than computer devices. For purposes of illustration, a computer-based user device is discussed in the present example although it will be understood that the present invention may be implemented with any appropriate user device.

A network domain may include a number of servers containing different kinds of information. Some of the information may be considered secure information (such as customer account information) and other information may be considered unsecure information (such as product description and support information). Secure information must be controlled such that it is not compromised in any way in communicating with users and/or other servers. In some systems, all servers are typically configured as either a secure server or an unsecure server. In the past, secure servers could not be in the same network domain as unsecure servers. Typically, the two types of servers are not able to communicate with each other in order to preserve the security of the secure information. However, that restriction conflicts with the requirements of most enterprise applications.

Thus, there is a need for an improved methodology and implementing system which enables efficient communication between secure and unsecure servers in general, and specifically when the servers are located in the same network domain.

SUMMARY OF THE INVENTION

A method and implementing computer system are provided in which a Quality Of Protection (QOP) indication is established for servers in a network domain. Each server may have one QOP setting associated with the server for inbound messages and another QOP setting associated with the server for outbound messages. In an exemplary embodiment, the QOP settings are contained in a list which may be updated to include additional QOPs which the server may be equipped to support.

BRIEF DESCRIPTION OF THE DRAWINGS

A better understanding of the present invention can be obtained when the following detailed description of a preferred embodiment is considered in conjunction with the following drawings, in which:

FIG. 2 is a flow chart illustrating an exemplary processing methodology for inbound transaction requests to the network domain;

FIG. 3 is a flow chart illustrating an exemplary processing methodology for outbound transactions from the network domain.

DETAILED DESCRIPTION

Figure 1:
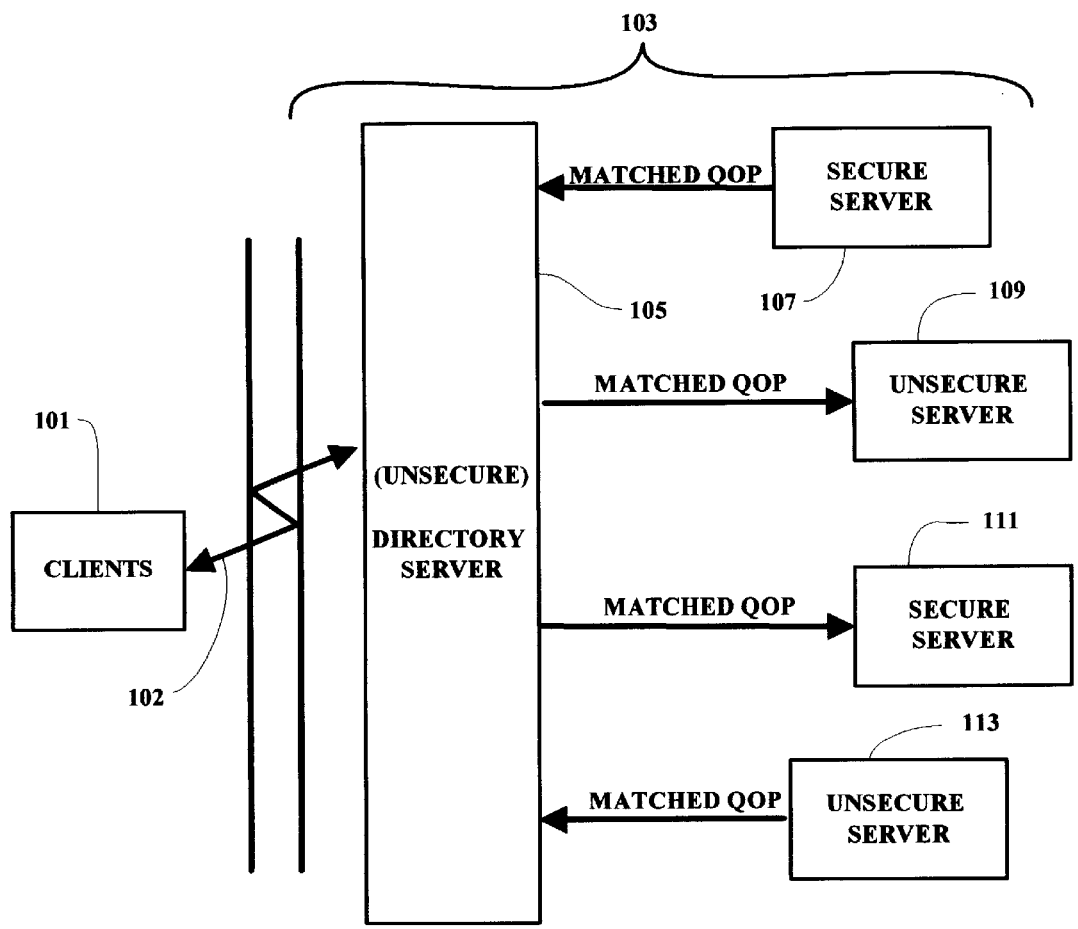
FIG. 1 is an illustration showing a network domain in which the present invention may be implemented.

The various methods discussed herein may be implemented within an exemplary network domain or web site as illustrated in FIG. 1. As shown in FIG. 1, clients using a network access device 101 are able to establish a link or communication connection 102 to a network domain or web site 103. The access device 101 may be a personal computer, a server, a terminal or even a hand-held device or other portable apparatus capable of establishing a communication coupling 102 to a network domain 103. The link 102 may be hard-wired, wireless or a combination of both. The network domain 103 may be comprised of a number of different servers. In the exemplary embodiment illustrated in FIG. 1, the network domain 103 includes an information control server or main directory server 105, which is connected to first and second secure servers 107 and 111, and also connected to first and second unsecure servers 109 and 113. In accordance with the present invention, the information control server 105 is capable of providing information to and also collecting information from both secure and unsecure servers in the network domain 103.

In the past, all servers in a network domain would be configured as either a secured server or unsecured server, and only limited communication could occur between the two differently configured servers. Each server or client had a single setting of security configuration for designating a Quality Of Protection (QOP) factor. Thus, each server was configured with a QOP level which would apply to both inbound and outbound messages. The inbound messages would go through a security check according to the security QOP requirements. The outbound messages would carry proper security information according to the security QOP configuration of the sending server. If a directory server was configured as a secure server, the server could only receive messages from other secure servers with a compatible security QOP. However, the secure server could send messages to other secure servers with a compatible QOP. If a directory server was configured as an unsecure server, the directory server could receive messages from both secure servers and unsecure servers, but the directory server could not send messages to secure servers because the directory server was unsecure.

In accordance with the present invention, servers are configured with an inbound message security QOP and a separate outbound message security QOP. The separate QOPs for inbound and outbound messages would replace the single security QOP setting. Thus, a directory server can configure the server's inbound message security QOP as "unsecure" and the server's outbound message QOP with a different QOP setting such that the directory server 105 can receive messages from both secure servers such as servers 107 and 111, as well as unsecure servers such as servers 109 and 113. The directory server 105 is also able to send or inquire information from both secure and unsecure servers. With the implementation of different inbound and outbound QOPS, it is possible to configure a network domain to allow co-existence of secure servers, which may contain sensitive customer information for example, together with unsecure servers which may contain product description and/or support information for example.

In connection with the present invention, the QOP of a server is communicated between a client and a server through a "tagged component". The tagged component contains a list of QOP indicators including one QOP for an inbound message security setting and another QOP setting for an outbound message security setting. Additional QOPs can be added to the list to indicate future QOP support capabilities of the server. A QOP can also be used as an indication of the maximum QOP that a server can support.

QOP settings can also be organized to apply to various aspects of the information being processed. For example, the QOP settings can be related to authenticity, integrity or confidentiality of the message being sent or received. The authenticity QOP implies client authentication and server authentication. Client authentication indicates whether or not a server will authenticate itself to other downstream servers in a communication. Server authentication indicates whether the server will require any downstream servers to authenticate themselves to the designated server on a cascaded method request. The integrity QOP implies the authenticity QOP and the message integrity detection. The message integrity detection indicates whether the server will require message integrity protection on cascaded method requests. The confidentiality QOP implies the integrity QOP and the message confidentiality detection. The message confidentiality indicates whether the server will require message confidentiality protection on cascaded method requests.

An example of one of many possible pseudocode implementations which may be used to practice the present invention is listed below:

FOR INBOUND REQUESTS:
   Inbound request received.
      Check request QOP against required QOP . . .
         If QOPs match, execute the request . . .
         Else, reject the request . . .
FOR OUTBOUND REQUESTS:
   Check for target's required QOP . . .
      If accepted,
         Send request and wait for response . . .

For inbound requests, the processing methodology is illustrated in FIG. 2. As shown, for an inbound request 201, the request is first detected 203 and a check is made 205 as to whether the request QOP, as determined from the request tag field, is compatible with or meets the requirements of the QOP of the target server. If the request QOP meets the QOP requirements of the target server 207, then the request is executed 209 and the process returns to await the next inbound request 201. If the QOPs do not match 207, then the request is rejected 211 and the process immediately returns to await the next inbound request 201.

As shown in FIG. 3, for outbound requests 301, when an outbound request is received 303, a check is made for the designated target's QOP 305. If the QOP of the target 307 can be satisfied by the server, then the outbound request is sent with that QOP 311 and the server will await a response 315 from the designated target. If the request is not accepted by the target 307, then the request is rejected 313 and the process returns to await the next outbound request 301.

Figure 4:
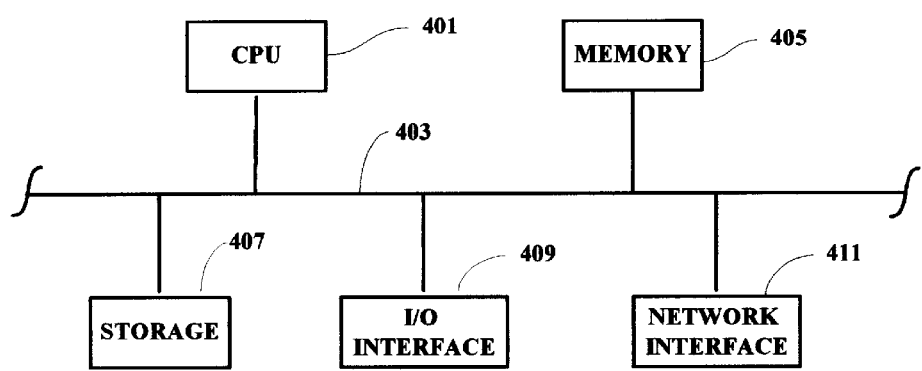
FIG. 4 is a block diagram of an exemplary server device which may be used in an implementation of the present invention.

An exemplary implementing computer server is illustrated in FIG. 4. As shown, a central processing unit (CPU) 401 is coupled to a system bus 403. A memory subsystem 405, a storage device 407 and an input/output (I/O) interface 409, and a network interface 411 are also connected to the system bus 403. The system illustrated may also include additional CPU units, bridge circuits and other devices which may be coupled to the bus 403. In applications where the present invention is implemented in software, code for implementing the disclosed methodology may be stored in the storage units and memory subsystems of the servers in a network. In general, an implementing server system may include a plurality of processors in a multi-bus system in a network of similar systems. Each server generally includes a system bus which connects to various system components including memory, storage, various I/O interfaces including various media devices and readers for inputting code, sub-system controllers and network and other interfaces to various other components or bus structures of any particular system. Circuit details of specific computer systems and sub-systems are not shown in any greater extent than that described above in order not to obfuscate the underlying concepts of the present invention or distract from the teachings of the present invention.

The method and apparatus of the present invention has been described in connection with a preferred embodiment as disclosed herein. The disclosed methodology may be implemented in many different ways in order to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on one of many possible media carriers, or other memory device, from which it may be accessed and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for enabling receiving and sending information between servers having different security configurations, said method comprising:
   establishing a plurality of quality of protection (QOP) designations, said QOP designations corresponding to different levels of security protection afforded by said servers;
   assigning a first QOP designation to a first server of said servers, said first QOP designation being associated with a first security level applicable to information which may be received by said first server; and
   assigning a second QOP designation to said first server, said second QOP designation being associated with a second security level applicable to information which may be transmitted from said first server, wherein said QOP designations are communicated between servers through a tagged component, said tagged component containing a list of said QOP designations related to inbound and outbound messages from a given server.

2. The method as set forth in claim 1 wherein said first and second QOP designations represent different security configurations of said first server.

3. The method as set forth in claim 2 and further including:
   enabling receipt by said first server of only information associated with said first QOP designation; and enabling transmission by said first server of only information associated with said second QOP designation.

4. The method as set forth in claim 3 wherein said transmission and receipt of information between servers occurs only for servers having matching QOP designations.

5. The method as set forth in claim 4 wherein information being communicated between said servers is identified relative to a QOP designation of a server originating a transmission of such information.

6. The method as set forth in claim 4 wherein information being communicated between said servers is identified relative to a QOP designation of a server sending such information.

7. The method as set forth in claim 6 and further including:
   detecting an outbound request from a sending server requesting to send information to a target server; and
   determining a QOP designation required by said target server for inbound requests.

8. The method as set forth in claim 7 and further including sending said outbound request including said matching QOP designation from said sending server to said target server if said outbound request is acceptable by said target server.

9. The method as set forth in claim 1 and further including modifying said list in accordance with configuration changes for said given server.

10. The method as set forth in claim 1 wherein said QOP designations are related to an authenticity aspect of said information.

11. The method as set forth in claim 1 wherein said QOP designations are related to an integrity aspect of said information.

12. The method as set forth in claim 1 wherein said QOP designations are related to a confidentiality aspect of said information.

13. A storage medium including machine readable coded indicia, said storage medium being selectively coupled to a reading device, said reading device being selectively coupled to processing circuitry, said reading device being selectively operable to read said machine readable coded indicia and provide program signals representative thereof, said program signals being effective to enable receiving and sending information between servers having different security configurations, said program signals being selectively operable to accomplish the steps of:
   establishing a plurality of quality of protection (QOP) designations, said QOP designations corresponding to different levels of security protection afforded by said servers;
   assigning a first QOP designation to a first server of said servers, said first QOP designation being associated with a first security level applicable to information which may be received by said first server; and
   assigning a second QOP designation to said first server, said second QOP designation being associated with a second security level applicable to information which may be transmitted from said first server, wherein said QOP designations are communicated between servers through a tagged component, said tagged component containing a list of said QOP designations related to inbound and outbound messages from a given server.

14. The storage medium as set forth in claim 13 wherein said first and second QOP designations represent different security configurations of said first server.

15. The storage medium as set forth in claim 14 wherein said program signals are further effective for:

enabling receipt by said first server of only information associated with said first QOP designation; and
enabling transmission by said first server of only information associated with said second QOP designation.

16. The storage medium as set forth in claim 15 wherein said transmission and receipt of information between servers occurs only for servers having matching QOP designations.

17. The storage medium as set forth in claim 16 wherein information being communicated between said servers is identified relative to a QOP designation of a server originating a transmission of such information.

18. The storage medium as set forth in claim 16 wherein information being communicated between said servers is identified relative to a QOP designation of a server sending such information.

19. The storage medium as set forth in claim 18 wherein said program signals are further effective for:
   detecting an outbound request from a sending server requesting to send information to a target server; and
   determining a QOP designation required by said target server for inbound requests.

20. The storage medium as set forth in claim 19 wherein said program signals are further effective for sending said outbound request including said matching QOP designation from said sending server to said target server if said outbound request is acceptable by said target server.

21. The storage medium as set forth in claim 13 and further including modifying said list in accordance with configuration changes for said given server.

22. The storage medium as set forth in claim 13 wherein said QOP designations are related to an authenticity aspect of said information.

23. The storage medium as set forth in claim 13 wherein said QOP designations are related to an integrity aspect of said information.

24. The storage medium as set forth in claim 13 wherein said QOP designations are related to a confidentiality aspect of said information.

25. A network domain comprising:
   a first server arranged to receive and send messages; and
   a second server coupled to said first server, said second server being arranged to send and receive messages to and from said first server, each of said first and second servers having quality of protection (QOP) designations associated therewith, said QOP designations being associated with different levels of security protection afforded by said first and second servers relative to information sent and received by said first and second servers, respectively, said first server having a first QOP designation, said first QOP designation being associated with a first security level applicable to information which may be received by said first server, said first server further having a second QOP designation, said second QOP designation being associated with a second security level applicable to information which may be transmitted from said first server, wherein said QOP designations are communicated between servers through a tagged component, said tagged component containing a list of said QOP designations related to inbound and outbound messages from a given server.

* * * * *